(12) United States Patent
Chelvayohan et al.

(10) Patent No.: US 7,835,041 B2
(45) Date of Patent: Nov. 16, 2010

(54) METHOD AND DEVICE FOR REDUCING A SIZE OF A SCANNING DEVICE

(75) Inventors: Mahesan Chelvayohan, Lexington, KY (US); Donald F. Croley, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 1335 days.

(21) Appl. No.: 11/232,624

(22) Filed: Sep. 22, 2005

(65) Prior Publication Data

US 2007/0070445 A1 Mar. 29, 2007

(51) Int. Cl.
*H04N 1/04* (2006.01)
*H04N 1/46* (2006.01)

(52) U.S. Cl. .............. 358/497; 358/474; 358/505
(58) Field of Classification Search .............. None
See application file for complete search history.

(56) References Cited

U.S. PATENT DOCUMENTS

| | | | |
|---|---|---|---|
| 6,064,497 A * | 5/2000 | Hannah | 358/486 |
| 6,304,313 B1 | 10/2001 | Honma | |
| 6,747,764 B1 | 6/2004 | Chu | |
| 6,781,934 B2 | 8/2004 | Kim et al. | |
| 6,876,383 B1 | 4/2005 | Beitscher | |
| 6,888,649 B2 | 5/2005 | Suzuki | |
| 7,369,280 B2 * | 5/2008 | Fredlund et al. | 358/400 |
| 2002/0057467 A1 * | 5/2002 | Tamaru | 358/505 |
| 2002/0105678 A1 | 8/2002 | Shiraiwa | |
| 2002/0135795 A1 | 9/2002 | Kwok et al. | |
| 2003/0057349 A1 * | 3/2003 | Hsiao et al. | 248/646 |
| 2003/0123102 A1 * | 7/2003 | Cho | 358/474 |
| 2003/0123107 A1 | 7/2003 | Sheng et al. | |
| 2003/0123110 A1 * | 7/2003 | Fang et al. | 358/520 |
| 2003/0142374 A1 | 7/2003 | Silverstein | |
| 2003/0147109 A1 * | 8/2003 | Chien | 358/505 |
| 2003/0174367 A1 * | 9/2003 | Huang et al. | 358/474 |
| 2004/0008969 A1 * | 1/2004 | Wilsher | 386/1 |
| 2004/0017593 A1 * | 1/2004 | Khovaylo | 358/474 |
| 2004/0066545 A1 | 4/2004 | Hofler | |
| 2004/0070798 A1 * | 4/2004 | Andersen et al. | 358/498 |
| 2004/0080795 A1 | 4/2004 | Bean et al. | |
| 2004/0136036 A1 * | 7/2004 | Horaguchi | 358/497 |
| 2004/0165222 A1 | 8/2004 | Huang | |
| 2004/0169870 A1 * | 9/2004 | Ahmed et al. | 358/1.8 |
| 2004/0190047 A1 | 9/2004 | Ito et al. | |
| 2004/0196484 A1 | 10/2004 | Masumoto et al. | |
| 2004/0207869 A1 | 10/2004 | Endo | |
| 2005/0012956 A1 | 1/2005 | Castle | |
| 2005/0036165 A1 | 2/2005 | Jia et al. | |
| 2005/0111033 A1 | 5/2005 | Silverbrook et al. | |
| 2005/0111042 A1 | 5/2005 | Ogiwara | |
| 2005/0128922 A1 | 6/2005 | Kim | |
| 2006/0238830 A1 * | 10/2006 | Dikeman | 358/500 |

* cited by examiner

*Primary Examiner*—Twyler L Haskins
*Assistant Examiner*—Mesfin Getaneh
(74) *Attorney, Agent, or Firm*—Coats & Bennett PLLC

(57) ABSTRACT

Scanning devices and method of use that accommodate a longer imaging distance while minimizing the size of the device. The scanning device may include an imaging unit having a sensor and optics. The scanning device may further include a target bed for placement of the targeted documents. An imaging distance extends between the imaging unit and the target bed. In one embodiment, the housing may be collapsed after the scanning procedure to reduce the overall device size. Reflective members may also be positioned within the interior of the device to lengthen the imaging distance. Still further embodiments may include a movable imaging unit.

50 Claims, 9 Drawing Sheets

METHOD AND DEVICE FOR REDUCING A SIZE OF A SCANNING DEVICE

CROSS REFERENCES TO RELATED APPLICATIONS

None

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates generally to scanners and scanning methods, and more particularly to those allowing for a reduced size scanner.

2. Description of the Related Art

Scanning devices are used in a variety of applications. Scanning devices may be combined in an all-in-one unit that includes scanning, image formation, and facsimile function. Scanning devices may also be independent and only capable of scanning documents. Historically, scanning devices include a drive mechanism that moves a scan bar across a target document. Each line of the document is individually scanned and the data is downloaded to a processor. This data is combined together to form a final two dimensional image of the document. These scanning devices require precise movement of the scan bar to prevent registration defects. Quality scans require intricate mechanisms which are often costly and complex.

Scanning devices, either of the all-in-one or independent variety, are popular for both business and personal use. Ideally, the devices are designed to have a smaller size that enables placement within small workspaces such as desk tops and bookshelves. As a result, size is often an important aspect when deciding to purchase a scanning device. Smaller devices are usually more accepted because of the ability to fit where needed and occupy a minimum space. Along with size, the price of the device is another important aspect during purchase. A device meeting other requirements may not be acceptable because of a higher price.

Digital photography technology has progressed with imaging units now able to produce high quality two dimensional images in a single step process. The imaging units are also economical allowing them to be utilized in new applications, such as document scanning technology. A drawback of imaging units is the relatively large imaging distance required between the unit and the target. This imaging distance requirement has prevented imaging units from being utilized within scanning devices.

SUMMARY

The present application is directed to embodiments for lengthening imaging distances within a scanning device without enlarging the size of the device. The scanning device may include an imaging unit having a sensor and optics. The scanning device further includes a target bed for placement of the targeted documents. An imaging distance extends between the imaging unit and the target bed. In one embodiment, the housing may be collapsed after the scanning procedure to reduce the overall device size. Reflective members may also be positioned within the interior of the device to increase the imaging distance. Still further embodiments may include a movable imaging unit.

DETAILED DESCRIPTION

The present application discloses embodiments for using an imaging unit within a scanning device. The scanning device includes an imaging unit and a target bed for placement of the target document. The scanning device may include a housing that extends around the internal components, including the imaging unit. The housing is constructed to accommodate the imaging distance required between the imaging unit and target bed while keeping the size of the scanning device as small as possible.

Figure 1:
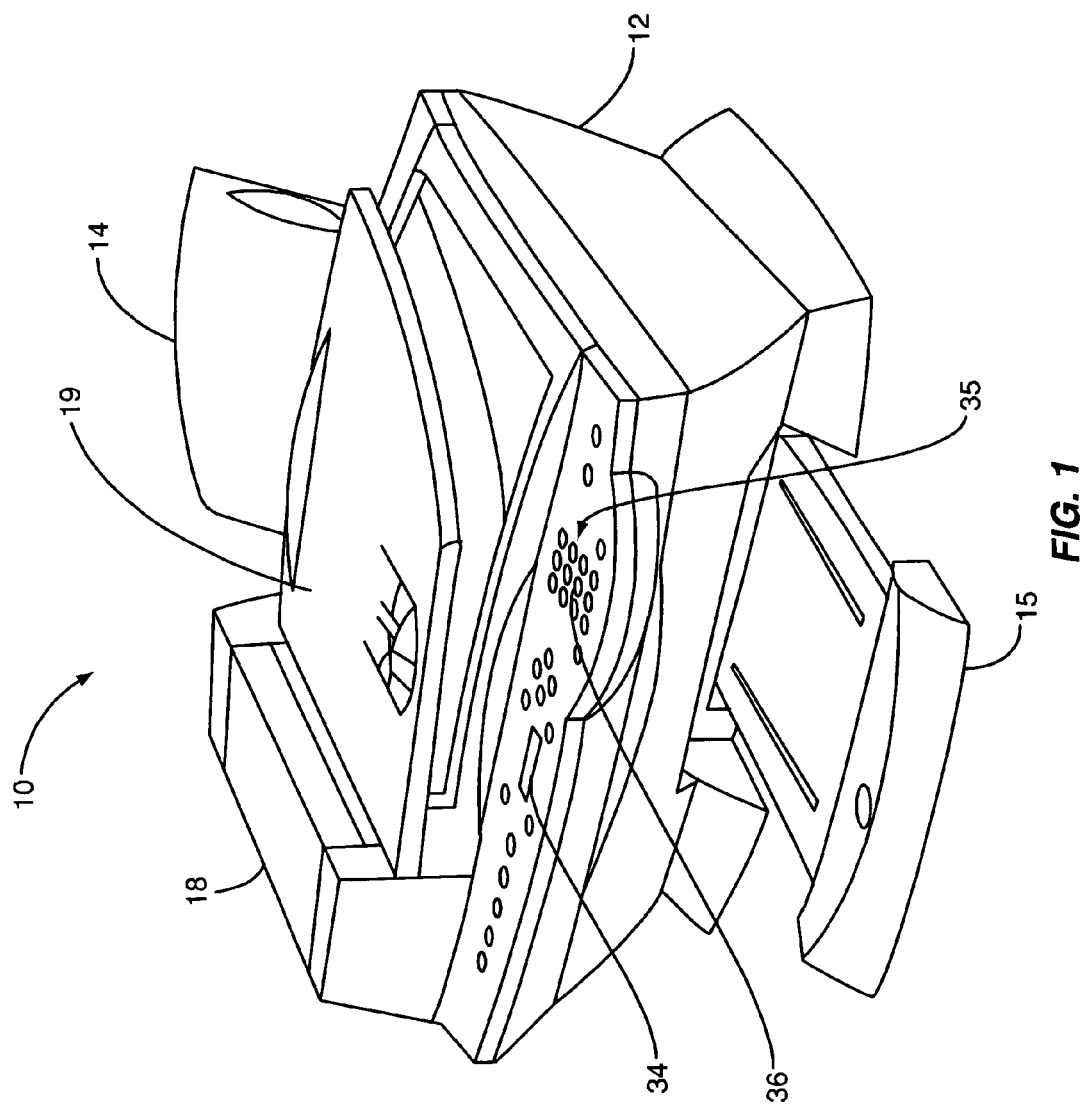
FIG. 1 is perspective view of a scanning device according to one embodiment of the present invention.

One embodiment of a scanning device is illustrated in FIG. 1 and indicated generally by the numeral 10. This embodiment features both scanning and image formation capabilities. Scanning device 10 comprises an exterior housing 12, a user interface 35, an imaging unit (not visible in FIG. 1), at least one media input tray 14 adapted to hold a stack of print media, a media output tray 15, and a document handler 18. In one embodiment, the document handler 18 is integrated into a cover 19 that may be lifted to expose a target bed (not visible in FIG. 1) on which individual target documents may be placed for subsequent scanning. Additional internal components for performing functions of image formation and scanning are not visible in the exterior view illustrated in FIG. 1.

Figure 2:
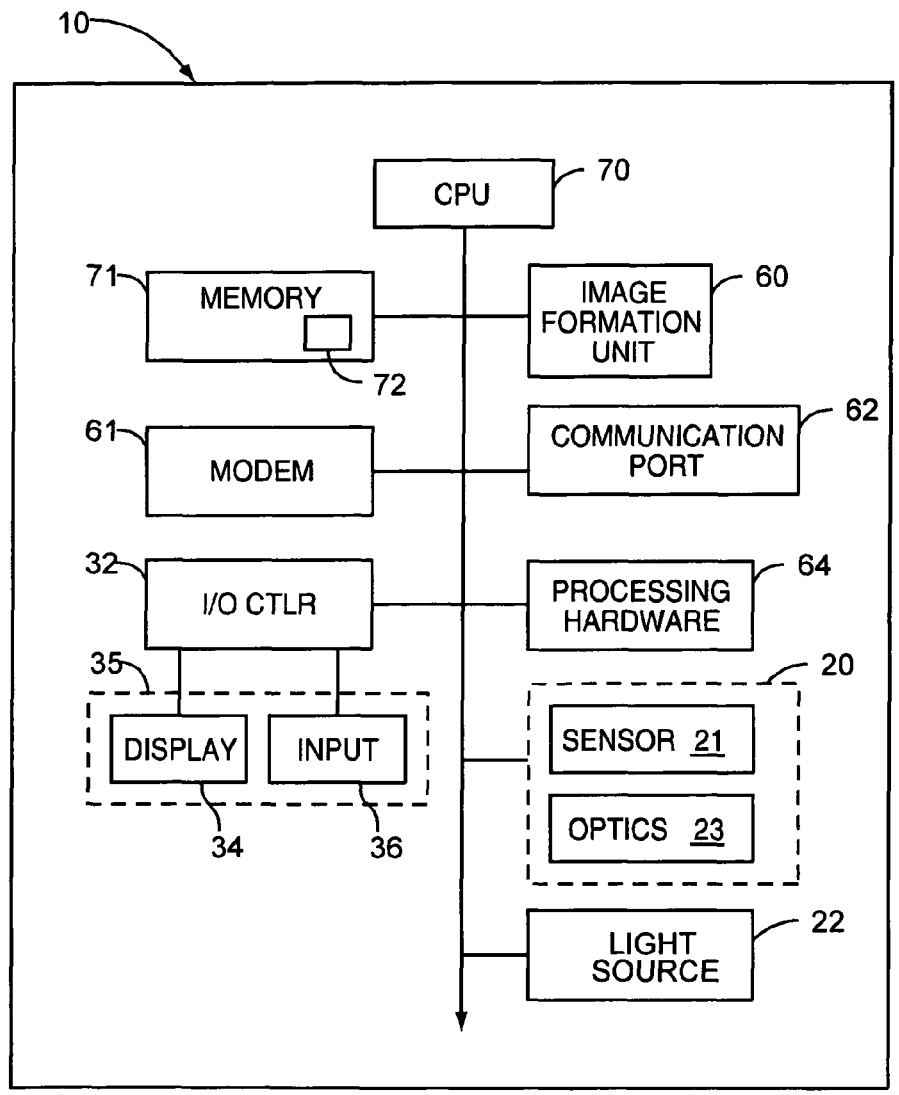
FIG. 2 is a block diagram of a scanning device according to one embodiment of the present invention.

FIG. 2 provides a simplified representation of some of the various functional components of the device 10 of FIG. 1. For instance, the device 10 includes an imaging unit 20 as well as an image formation unit 60, which may itself include a conventionally known ink jet or laser printer with a suitable document transport mechanism. Interaction at the user interface 35 is controlled with the aid of an I/O controller 32. Thus, the I/O controller 32 generates user-readable graphics at a display 34 and interprets commands entered at a keypad 36.

The device 10 may also include one or more processors 70, system memory 71, which generically encompasses RAM and/or ROM for system operation and code storage as represented by numeral 72. The system memory 71 may suitably comprise a variety of devices known to those skilled in the art such as SDRAM, DDRAM, EEPROM, Flash Memory, and perhaps a fixed hard drive. Those skilled in the art will appreciate and comprehend the advantages and disadvantages of the various memory types for a given application.

Additionally, the device 10 may include dedicated image processing hardware 64, which may be a separate hardware circuit, or may be included as part of other processing hardware. For example, control of the imaging unit 20 and of subsequent image processing may be implemented via stored program instructions for execution by one or more Digital Signal Processors (DSPs), ASICs or other digital processing circuits included in the processing hardware 64. Alternatively, stored program code 72 may be stored in memory 71, with the control techniques described herein executed by some combination of processor 70 and procesing hardware 64, which may include programmed logic devices such as PLDs and FPGAs.

FIG. 2 also illustrates the imaging unit 20 including a sensor 21 and optics 23. A light source 22 is also included to provide adequate uniform illumination for the original target document. Exemplary types of sensors 21 may include CCD and CMOS sensors. Multilayer direct image sensors may also be used. The optics 23 may comprise different types of elements, such as some combination of mirrors, prisms, lenses, and beam splitters. The optical lenses may be wide angle or telephoto lenses adapted to focus an image of an original document onto the sensor 21 with minimum distortion or other optical aberrations. Other types of lenses may be used where appropriate.

Image sensors that can be used include digital CMOS imaging modules, typically used in digital cameras, that currently are available in various megapixels (MP) sizes and are available from manufacturers such as Micron Technology, Inc., 8000 S. Federal Way, P.O. Box 6, Boise, Id. 83707-0006 or Omnivision Technologies, Inc., 1341 Orleans Drive, Sunnyvale, Calif. 94089. As shown, these imaging modules will have equivalent scan resolutions for 8.5×11 inch scanner and 4×6 inch scanner (typically used for scanning photographs as summarized in Table 1.

TABLE 1

| Imaging Sensor Size (MP) (4:3 aspect ratio) | 8.5 × 11 Scanner Equivalent Resolution (ppi) | 4 × 6 Scanner Equivalent Resolution (ppi) |
| --- | --- | --- |
| 1 | 102 | 192 |
| 2 | 144 | 272 |
| 3 | 176 | 333 |
| 4 | 204 | 385 |
| 5 | 228 | 430 |
| 6 | 250 | 471 |
| 7 | 270 | 509 |
| 8 | 288 | 544 |
| 9 | 306 | 577 |
| 10 | 322 | 609 |

The table illustrates that a 4×6 inch photo scanner (200 ppi) can be designed with a 1 MP digital imaging sensor while 8.5×11 inch scanner can use a 4 MP digital imaging sensor.

Figure 3A:
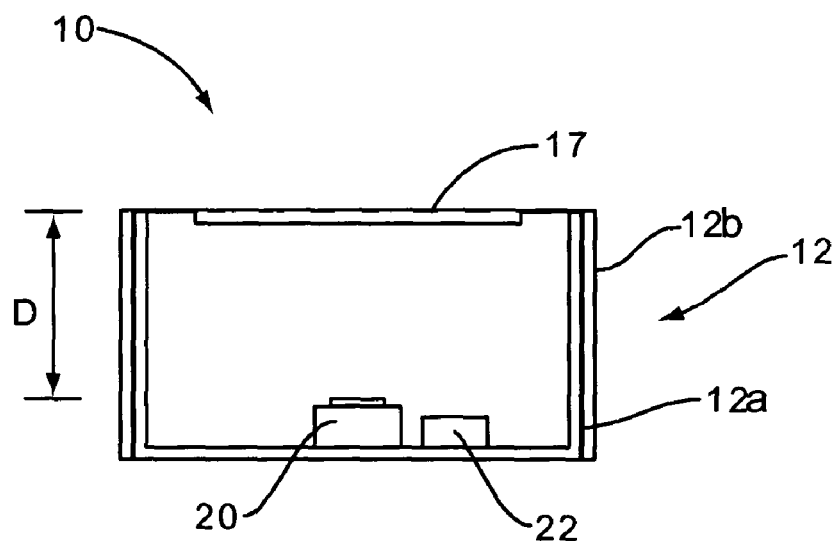
FIG. 3A is a schematic view of a scanning device in a closed position according to one embodiment of the present invention.
Figure 3B:
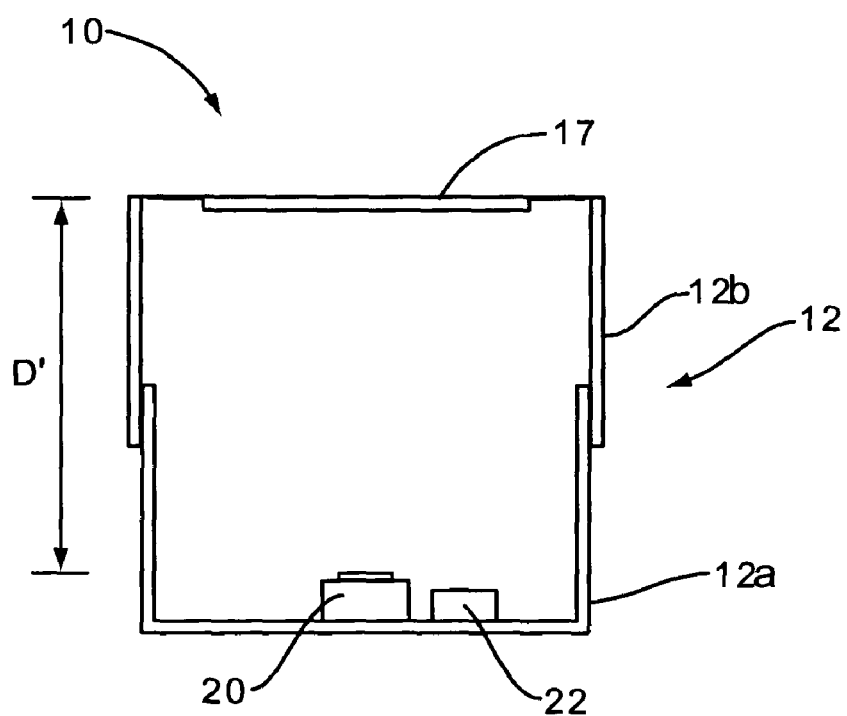
FIG. 3B is a schematic view of a scanning device in an open position according to one embodiment of the present invention.

FIG. 3A illustrates a simplified schematic view of one embodiment of the scanning device 10 with the imaging unit 20 positioned a distance D away from the target bed 17. A light source 22 is positioned adjacent to the imaging unit 20. A previous drawback of digital photography technology is the relatively large imaging distance required for capturing an image of the target document. To compensate for the large imaging distance, housing 12 is divided into a lower housing 12a and an upper housing 12b. The housings 12a, 12b are movable relative to each other between a collapsed position as illustrated in FIG. 3A, and an expanded position as illustrated in FIG. 3B. Distance D' is referred to as the imaging distance and extends between the target bed 17 and the imaging unit 20. The distance D' between the target bed 17 and the imaging unit 20 is larger than the collapsed position D. The enlarged length provides adequate space for the imaging unit 20 to focus on and accurately capture an image of the document placed on the target bed 17 in a single step process (i.e., not in multiple line-by-line steps). The smaller dimensions of the device 10 illustrated in FIG. 3A accommodate storage when the scanning features are not in use. The other functions of the device 10, such as image formation, facsimile, etc., are not affected by the position of the housing 12 and are operable in either the collapsed or expanded positions.

In this embodiment, the housing 12 forms an exterior shell that extends around the internal elements defined in FIG. 2. The housing 12 may also act as a shield to prevent exterior light from reaching the interior. Target bed 17 provides a surface for positioning the original target document. In one embodiment, target bed 17 is mounted to the housing 12. The target bed 17 may be constructed of a transparent material, such as glass, to allow transmittal of light from the light source 22, and the reflected image beam that is detected by the imaging unit 20. A cover 19 (as shown in FIG. 1) may be positioned over the target bed 17 to block the exterior light from reaching the interior of the housing 12.

Figure 4A:
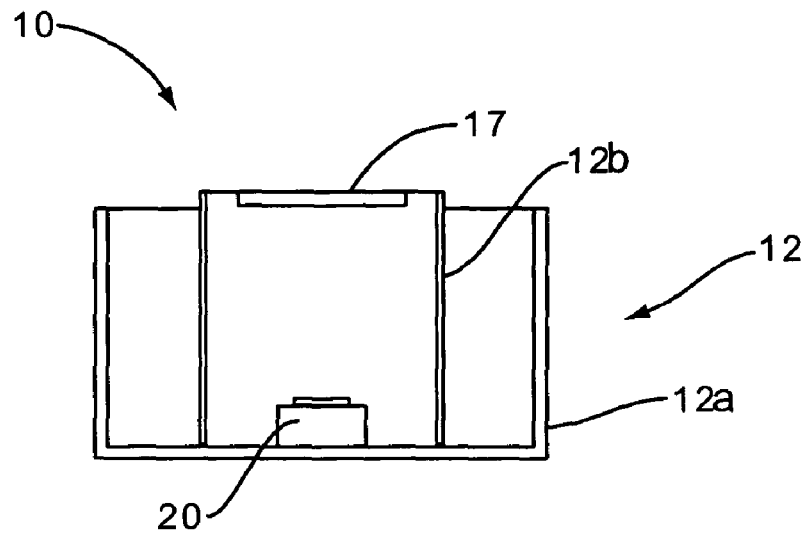
FIG. 4A is a schematic view of a scanning device in a closed position according to one embodiment of the present invention.
Figure 4B:
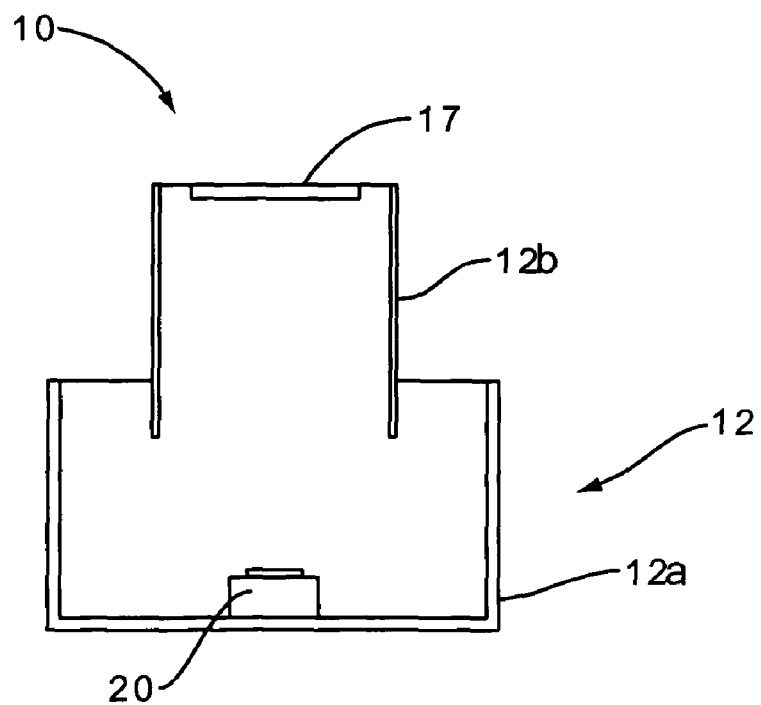
FIG. 4B is a schematic view of a scanning device in an open position according to one embodiment of the present invention.

In one embodiment as illustrated in FIGS. 3A and 3B, the lower and upper housings 12a, 12b are substantially equal in size. In this embodiment, the entire device 10 divides with the elements in the lower housing 12a becoming separated from the elements in the upper housing 12b when moved to the expanded position. In another embodiment, housings 12a, 12b have a different size. FIGS. 4A and 4B illustrate one example with the lower housing 12a being larger than the upper housing 12b. Imaging unit 20 is positioned opposite from the target bed 17 with the housings 12a, 12b being adjustable from a smaller collapsed position to a larger expanded position. FIGS. 4A and 4B illustrate the upper housing 12b centered within the lower housing 12a. Upper housing 12b may be positioned at a variety of locations relative to the lower housing 12a. In this embodiment, the light source is incorporated within the imaging unit 20.

Figure 5A:
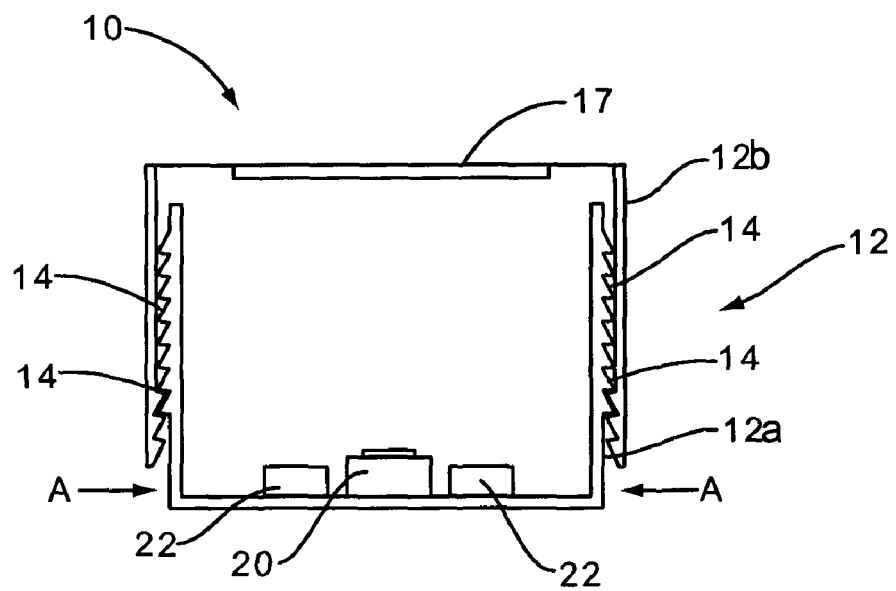
FIG. 5A is a schematic view of a scanning device in a closed position according to one embodiment of the present invention.
Figure 5B:
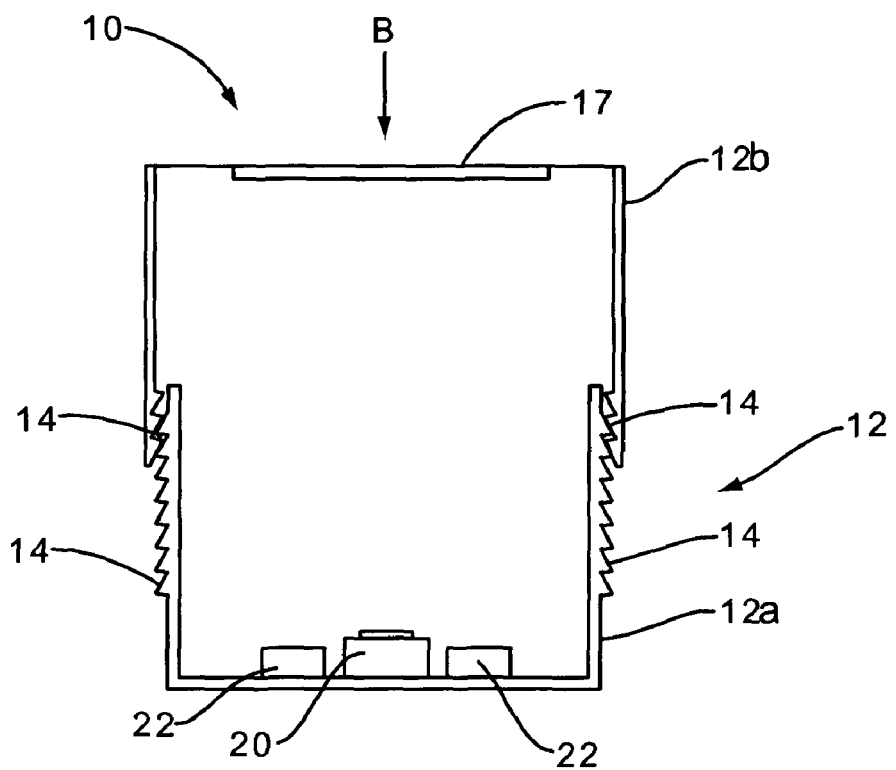
FIG. 5B is a schematic view of a scanning device in an open position according to one embodiment of the present invention.

The housings 12a, 12b provide expanding and collapsing movement. FIGS. 5A and 5B illustrate one embodiment with each housing 12a, 12b having teeth 14 that mate together. Teeth 14 have a ramped shape that prevents the housings 12a, 12b from moving towards the expanded position. Force A applied to one or both sides of the lower housing 12a flexes the housing 12a inward and allows the upper housing 12b to move to the expanded position as illustrated in FIG. 5B. Removal of the force A flexes the housing 12a outward to re-engage the teeth 14 and maintain the expanded position. Once in the expanded position, a force B causes the teeth 14 to slide along each other as the upper housing 12b is moved to the collapsed position. In other embodiments, the orientation of the ramped teeth 14 may be reversed such that the application of inward force A is required to flex the lower housing 12a inward to move the housings 12a, 12b to the closed position.

The teeth 14 may extend along the entire length of the housing as illustrated in FIGS. 5A and 5B. In another embodiment, teeth 14 extend only along a limited length of the housings 12a, 12b. Teeth 14 may also be positioned on only one side of the housings 12a, 12b.

Use of the collapsible housing 12 includes separating the housing sections 12a, 12b from the collapsed position. In the expanded position, the imaging distance is set between the imaging unit 20 and the target bed 17 to accurately capture an image of the target document in a single step. Light from the light source 22 illuminates the target document and a reflected image beam is detected by the imaging unit 20 and processed by the processor 70. After the image of the target document is captured, the housings sections 12a, 12b can be returned to the collapsed position such that the device 10 occupies as little space as possible. The other functions of the device 10, such as image formation, facsimile functions, etc. may continue while the housing sections 12a, 12b are in either position.

Figure 6:
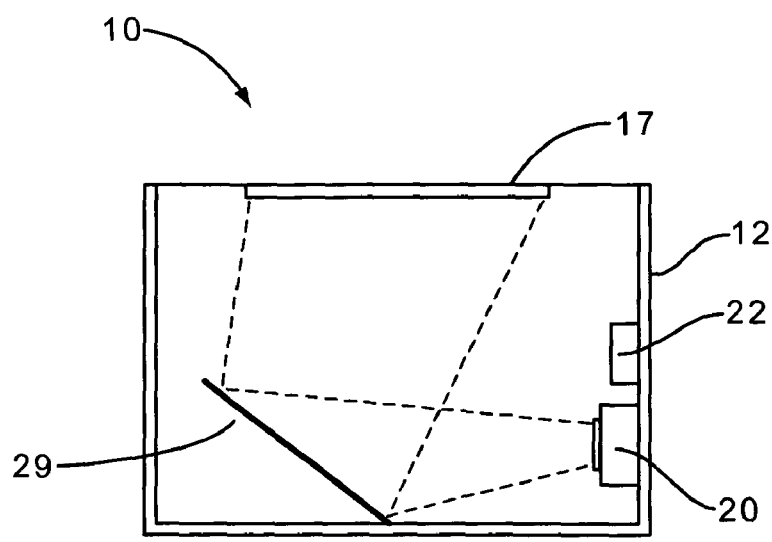
FIG. 6 is a schematic view of a reflective member positioned within the scanning device according to one embodiment of the present invention.

Utilizing a reflective member 29 is another manner of minimizing the device size for a given imaging distance. As illustrated in the embodiment of FIG. 6, reflective member 29 is positioned between the imaging unit 20 and the target bed 17. This positioning increases the imaging distance to now equal the combined distance between the imaging unit 20 and reflective member 29 and between reflective member 29 and the target bed 17. This configuration increases the effective imaging distance with a smaller housing size. The reflective member 29 may have a variety of shapes and sizes depending upon the parameters of the device 10. In one embodiment, reflective member 29 is a flat mirror.

Figure 7:
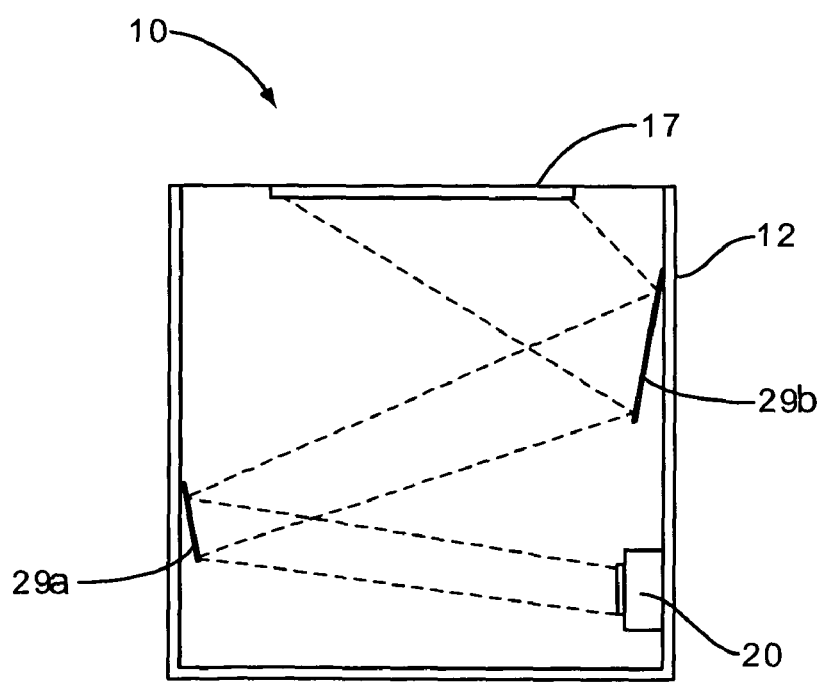
FIG. 7 is a schematic view of multiple reflective members positioned within the scanning device according to one embodiment of the present invention.

More than one reflective member 29 may be used to increase the imaging distance. These members 29 may be positioned at various locations within the housing 12 between the imaging unit 20 and the target bed 17. The members 29 may be identical in size and shape, or may have different characteristics. FIG. 7 illustrates one embodiment utilizing two reflective members 29. First reflective member 29a and second reflective member 29b act in combination to increase the overall imaging distance. In this embodiment, a light source is incorporated within imaging unit 20.

Figure 8A:
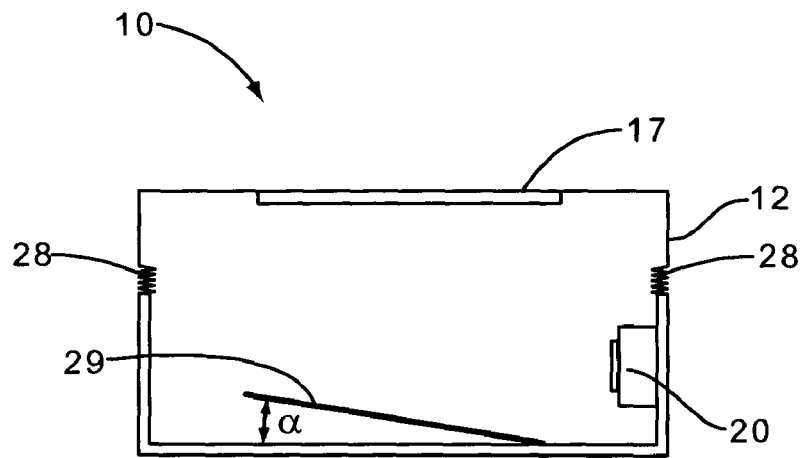
FIG. 8A is a schematic view of a reflective member in a collapsed position within the scanning device according to one embodiment of the present invention.
Figure 8B:
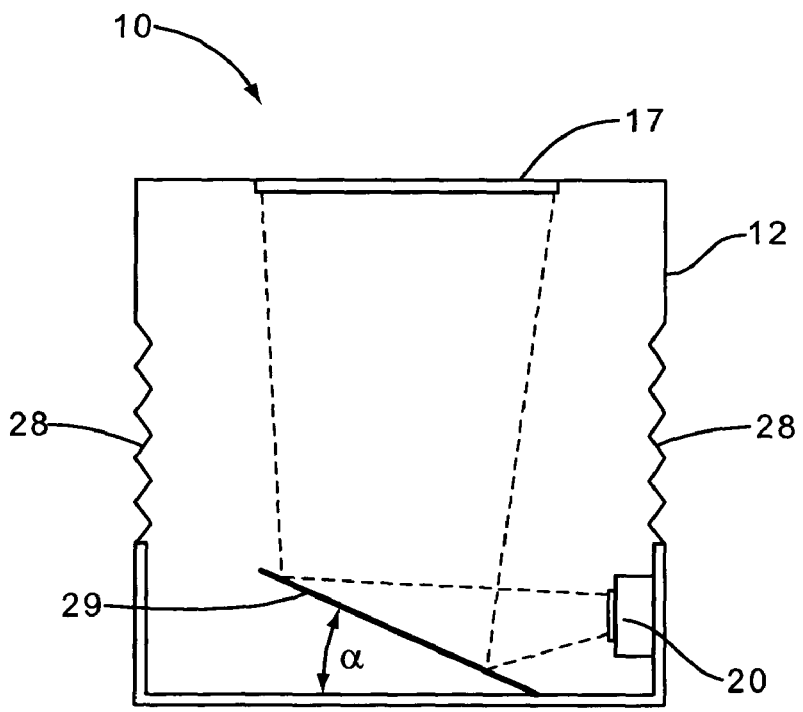
FIG. 8B is a schematic view of a reflective member in an expanded position within the scanning device according to one embodiment of the present invention.

The embodiments of the reflective member and upper and lower housings 12a, 12b can be combined together. FIGS. 8A and 8B illustrate an embodiment featuring a collapsible housing 12 and a reflective member 29. Expandable joints 28 on the housing 12 are selectively positionable between a collapsed position as illustrated in FIG. 8A and an expanded position as illustrated in FIG. 8B. The reflective member 29 is positioned within the housing 12 and movable between two separate orientations. When the housing 12 is collapsed, reflective member 29 forms an angle $\alpha$ with a bottom of the housing 12. Expansion of the housing 12 to the second position as illustrated in FIG. 8B pivots the reflective member 29 upward to increase the angle $\alpha$. Once in the second position, imaging unit 20 is set a predetermined distance away and is able to capture an image of a document placed on the target bed 17 in a single step. A second reflective member (not illustrated) may also be positioned within the collapsible housing 12 to further lengthen the imaging distance. The second reflective member may be pivotable, or may be statically positioned within the interior of the housing 12.

Figure 9:
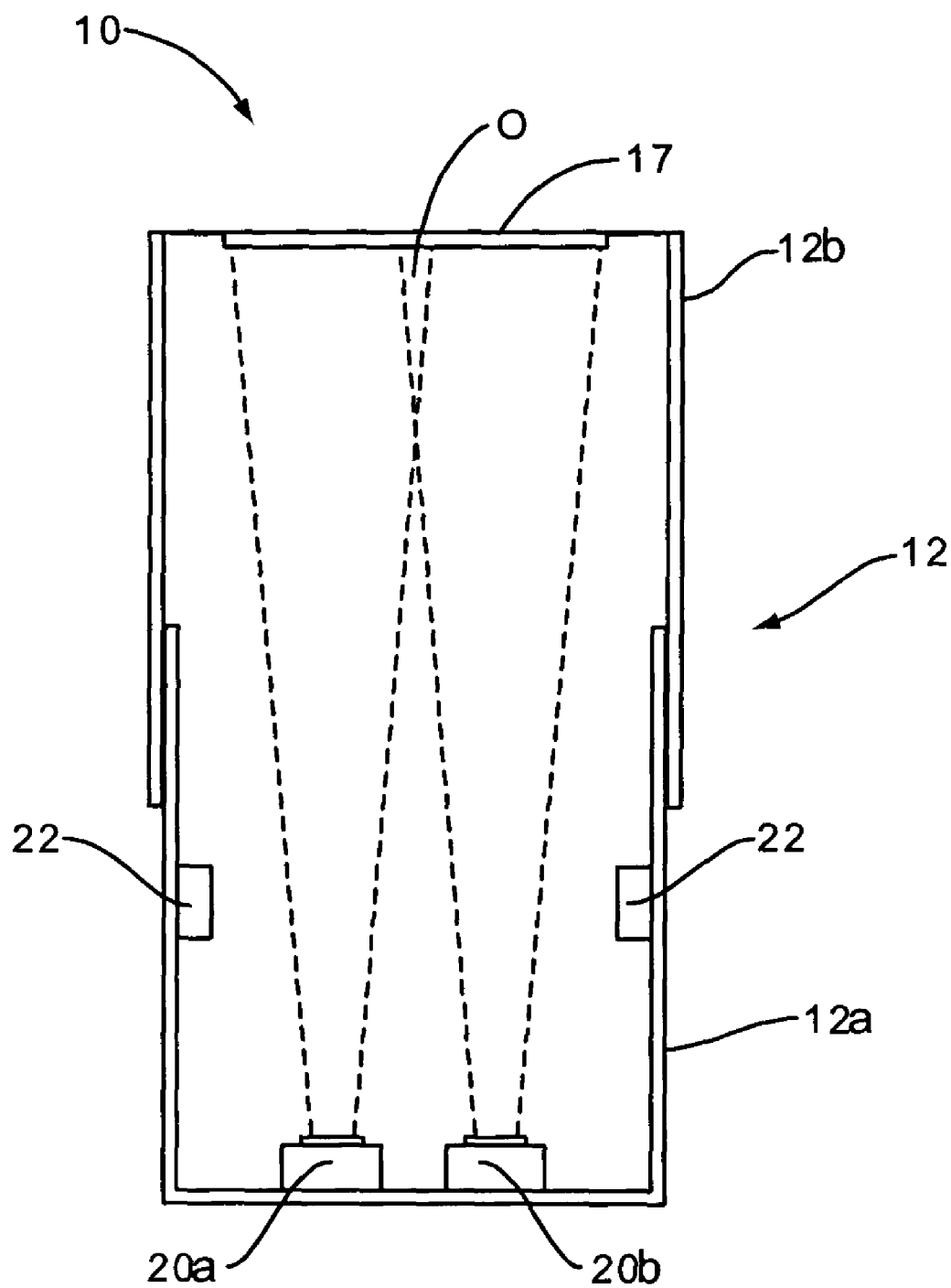
FIG. 9 is a schematic view of multiple imaging units within an scanning device according to one embodiment of the present invention.

Multiple imaging units 20 may be used to reduce the necessary length of the imaging distance. The multiple imaging units 20 are each positioned within the housing 12 to capture a section of the image of the target document. Acting together, the imaging units 20 capture the entire document. The smaller target sections can be captured with a smaller imaging distance than would be required if a single unit was to capture an image of the entire document. FIG. 9 illustrates a two-section housing 12a, 12b in an expanded position with an imaging distance allowing for the imaging units 20a, 20b to capture an image of the target document. First imaging unit 20a captures in a single step a first portion of the document image placed on the target bed 17. Second imaging unit 20b captures in a single step a second portion of the document image. The areas of the image captured by each imaging unit 20a, 20b may be of equal size, or one may be larger than the other. Likewise, the imaging units 20a, 20b may be similar or different. An area of overlap O is captured by both the first and second imaging units 20a, 20b. The information from the multiple imaging units 20a, 20b is processed by processor 70. U.S. patent application Ser. No. 10/376,174 filed Mar. 28, 2003, entitled "System and Methods for Multiple Imaging Element Scanning and Copying" and assigned to the assignee of this application, discloses methods of processing image beam information from multiple imaging units and is herein incorporated by reference in its entirety.

Figure 10:
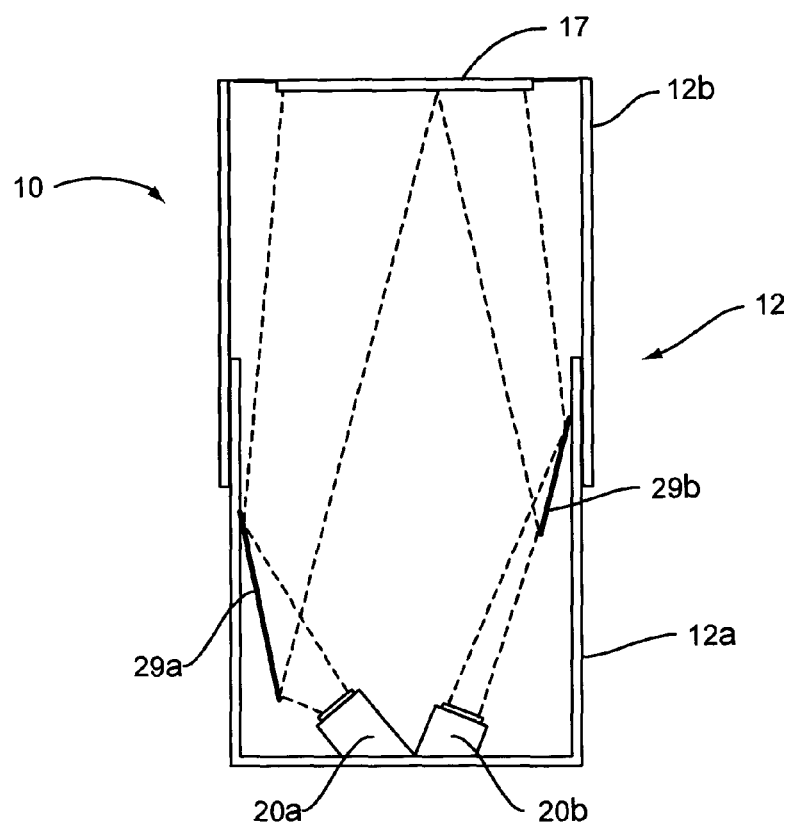
FIG. 10 is a schematic view of multiple imaging units and reflective members within a scanning device according to one embodiment of the present invention.

FIG. 10 illustrates another embodiment of a multiple imaging unit device. First imaging unit 20a uses a first reflective member 29a to capture a first section of an image of the document placed on the target bed 17. A second imaging unit 20b uses a second reflective member 29b to capture a second section of the image of the target document on the target bed 17. In combination, units 20a, 20b capture the entire document placed on the target bed 17. In this embodiment, the first reflective member 29a is larger than the second reflective member 29b. Also, the first imaging unit 20a captures a larger area than the second imaging unit 20b.

Another manner of decreasing the overall device size for a given imaging distance is by using a movable imaging unit 20. The imaging unit 20 moves within the housing 12 to capture different sections of the target document. These sections have a width greater than a single line and the image within each section is captured in a single step. The imaging unit 20 may be positioned at a number of different positions each for capturing a section of the target document. The multiple sections are combined together to scan the entire target document. The sections of the captured document may be the same size, or may be of different sizes.

Figure 11:
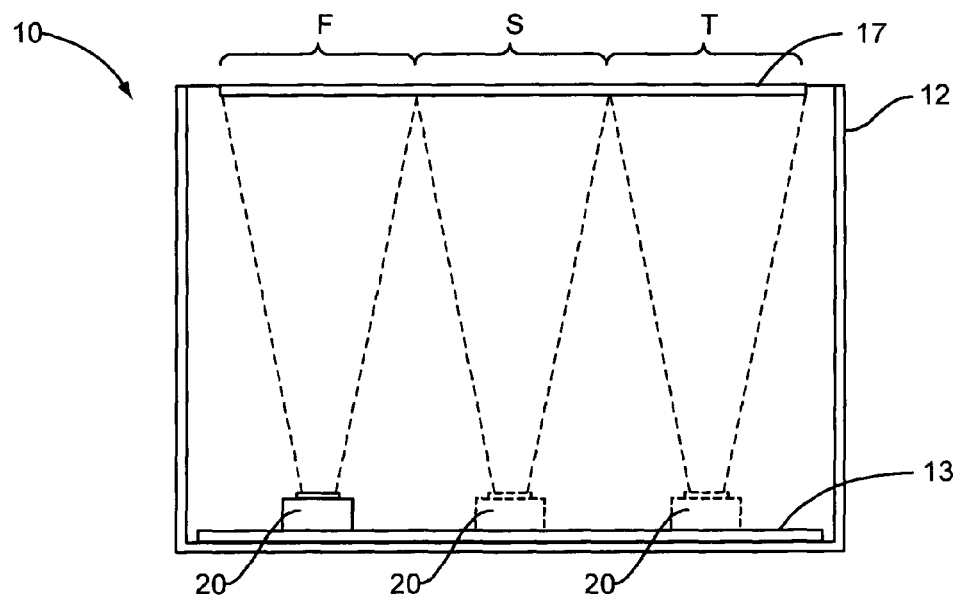
FIG. 11 is a schematic view of a movable imaging unit according to one embodiment of the present invention.

FIG. 11 illustrates one embodiment of the movable imaging unit 20 using three positions. Imaging unit 20 is positioned on a track 13 or is otherwise movable within the interior of the housing 12. As in the other embodiments, a target document is placed on the target bed 17. In a first position illustrated in solid lines, imaging unit 20 captures a first section or fraction F of the image of the target document. The first section or fraction F has a width that comprises multiple pixel rows as illustrated in FIG. 11. After imaging the first section, imaging unit 20 is moved to a second position illustrated in dashed lines and captures a second fraction or section S of the image of the target document. Finally, imaging unit 20 moves to the third position and captures a third fraction or section T of the image of the target document. In this embodiment, the width of each section is about one-third of the total document width. Between the three positions, the entire image of the target document is captured by the combination of the three fractions of the image captured by the imaging unit 20. Between 2 to 5 fractions or more could be combined together to capture the target image. The imaging distance may be shorter in this embodiment because each position captures a fraction of the overall image of the target document. Capturing the image of the entire target document from one position may require a larger imaging distance. In one embodiment, a mechanism used for moving a cartridge within an image formation unit 60 of the device 10 is also used to move the imaging unit 20 to the various positions.

The various different embodiments may be used individually or in combination to capture the target document. By way of example, the movable imaging unit 20 may be used in combination with the collapsible housing 12a, 12b. Further, multiple imaging units 20 may be used in combination with the housing 12 with expandable joints 28.

The display 34 may be embodied as an alphanumeric or graphical LCD display and keypad 36 may be an alphanumeric keypad. Alternatively, the display and input functions may be implemented with a composite touch screen (not shown) that simultaneously displays relevant information, including images, while accepting user input commands by finger touch or with the use of a stylus pen (not shown).

The exemplary embodiment of the device 10 also includes a modem 61, which may be a fax modem compliant with commonly used ITU and CCITT compression and communication standards such as the V.XX and Class 1-4 standards known by those skilled in the art. The device 10 may also be coupled to a computer or computer network (not shown) through a compatible communication port 62, which may comprise a standard parallel printer port, a serial data interface such as USB 1.1, USB 2.0, IEEE-1394 (including, but not limited to 1394a and 1394b) and the like.

Device 10 may also include integrated wired or wireless network interfaces. Therefore, communication port 62 may also represent a network interface, which permits operation of the device 10 as a stand-alone device. A wired communication port 62 may comprise a conventionally known RJ-45 connector for connection to a 10/100 LAN or a 1/10 Gigabit Ethernet network. The wireless communication port 62 may comprise an adapter capable of wireless communications with other devices in a peer mode or with a wireless network in an infrastructure mode. Accordingly, the wireless communication port 62 may comprise an adapter conforming to wireless communication standards such as Bluetooth®, the various 802.11 standards, 802.15 or other standards known to those skilled in the art.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A scanning device comprising:
   a target bed;
   an imaging unit operative to capture an image of a document placed on the target bed;
   a housing that extends at least partially around the imaging unit, the housing comprising a first housing section movably connected to a second housing section; and
   means for varying an imaging distance between a first distance and a second distance, the imaging distance being within the housing and being an optical distance between the imaging unit and the target bed, wherein the target bed is disposed in parallel planes at the first and second distances and the first housing section and the second housing section are movable between a first position establishing the imaging distance and a second position having a smaller overall size than the first position.

2. The device of claim 1, further comprising an image forming unit positioned within the housing and operative to form a copy of the image captured by the imaging unit.

3. The device of claim 2, wherein the image forming unit is a printer.

4. The device of claim 1, wherein the imaging unit is positioned within the first housing section and the target bed is positioned in the second housing section.

5. The device of claim 1, wherein the imaging unit comprises a sensor and optics.

6. The device of claim 1, wherein the housing extends around an exterior of the imaging unit and the target bed and prevents external light from reaching an interior of the housing.

7. The device of claim 1, wherein the imaging unit is configured to capture the image of the document in a single step.

8. The device of claim 1, further comprising a processor operatively connected to the imaging unit, with the housing extending around the processor.

9. A scanning device comprising:
   a first housing section;
   a second housing section movably connected with the first housing section, the second housing section being linearly movable in a parallel plane between a first position and a second position;
   an imaging unit positioned within the first and second housing sections and operatively connected to the first housing section; and
   a target bed connected to the second housing section wherein a distance between the target bed and the imaging unit being greater in the first position than in the second position.

10. The device of claim 9, wherein an imaging distance is formed between the imaging unit and the target bed when the first and second housing sections are in the first position and being sized for the imaging unit to capture an image of a target document placed on the target bed.

11. The device of claim 10, wherein an overall size of the scanning device is larger in the first position than in the second position when the first and second housing sections are moved together in closer proximity.

12. The device of claim 9, wherein the first and second housings form a barrier to prevent external light from reaching the imaging unit.

13. The device of claim 9, wherein the first and second housing sections have a width that is substantially equal.

14. The device of claim 9, wherein the first housing section is larger than the second housing section.

15. The device of claim 14, wherein the second housing section is centered within the first housing section.

16. The device of claim 9, wherein the second housing section further comprises a cover that extends over the target bed on an opposite side from the imaging unit.

17. The device of claim 9, wherein the first and second housing sections comprise teeth that engage together to maintain the sections at the first position and at the second position.

18. The device of claim 9, further comprising a reflective member positioned between the imaging unit and the target bed.

19. The device of claim 18, wherein the reflective member is movably positioned relative to the imaging unit in a first orientation when the second housing section is in the first position and a second orientation when the second housing section is in the second position.

20. The device of claim 9, further comprising a second imaging unit, the imaging unit aligned to capture a first fraction of an image of a document on the target bed and the second imaging unit aligned to capture a second fraction of the image of the document on the target bed.

21. The device of claim 9, wherein the imaging unit is movably positioned within the first housing section, the imaging unit movable between a first location to capture a first fractional image of a document positioned on a first section of the target bed, and a second location to capture a second fractional image of the document positioned on a second section of the target bed in a single step, the first and second fractional images each being captured in a single step and encompassing an entire image of the document.

22. A scanning device comprising:
a target bed;
an imaging unit operative to capture an image of a document placed on the target bed;
an image forming unit operative to form a copy of the image captured by the imaging unit; and
an exterior housing having the target bed disposed thereon, the exterior housing extending at least partially around the imaging unit and the image forming unit, the exterior housing being linearly movable in parallel planes between a first position with a first imaging distance between the imaging unit and the target bed, and a second position with a second imaging distance between the imaging unit and the target bed, the first distance being greater than the second distance.

23. The device of claim 22, wherein the target bed is positioned within a wall of the exterior housing.

24. The device of claim 22, wherein the imaging unit comprises a sensor and optics that captures the image in a single step.

25. The device of claim 22, wherein the image forming unit is a printer.

26. The device of claim 22, wherein the exterior housing comprises first and second sections, the sections are relatively movable between the first and second positions with the target bed operatively connected to the second section and the imaging unit operatively connected to the first section.

27. The device of claim 22, wherein the exterior housing further comprises expandable joints selectively positionable between a retracted position and an extended position.

28. The device of claim 22, further comprising a cover positioned on an outside of the exterior housing, the cover positioned to extend over the target bed.

29. The device of claim 22, wherein the exterior housing comprises teeth that engage together to maintain the exterior housing between the first and second positions.

30. The device of claim 22, further comprising a reflective member positioned within the exterior housing to lengthen an imaging distance between the imaging unit and the target bed.

31. The device of claim 30, wherein the reflective member is movable relative to the imaging unit between a first extended orientation when the exterior housing is in the first position, and in a second folded orientation when the exterior housing is in the second position.

32. The device of claim 22, further comprising a second imaging unit, the imaging unit aligned to capture a first fraction of an image of a document on the target bed and the second imaging unit aligned to capture a second fraction of the image.

33. The device of claim 22, wherein the imaging unit is movably positioned within the exterior housing, the imaging unit movable between a first location to capture a first fractional image of the document positioned on a first section of the target bed, and a second location to capture a second fractional image of the document positioned on a second section of the target bed in a single step, the first and second fractional images each being captured in a single step and encompassing an entire image of the document.

34. The device of claim 22, further comprising a facsimile unit positioned within the exterior housing operative to send the image captured by the imaging unit.

35. A scanning device comprising:
a target bed;
an imaging unit positioned a distance away from the target bed, the imaging unit operative to capture in a single step an image of a document placed on the target bed;
an exterior housing that extends at least partially around the imaging unit; and
a reflective member positioned within the exterior housing between the imaging unit and the target bed, the reflective member being movable between a first orientation and a second orientation for varying the optical distance between the imaging unit and the target bed.

36. The device of claim 35, further comprising an image forming unit positioned within the exterior housing and operative to print a copy of the image captured by the imaging unit.

37. The device of claim 35, wherein the reflective member is movably positionable between a first orientation forming a first angle with a bottom of the exterior housing, and a second orientation forming a second angle with a bottom of the exterior housing, the first angle being greater than the second angle.

38. The device of claim 35, further comprising a second reflective member within the exterior housing and positioned between the imaging unit and the target bed.

39. The device of claim 35, wherein the exterior housing is selectively positionable between an extended position and a collapsed position, a distance between the imaging unit and the target bed being greater in the extended position than in the collapsed position.

40. A scanning device comprising:
a target bed;
an imaging unit operative to capture fractions of an image of a document placed on the target bed, each of the fractions having widths of multiple pixel rows; and
an exterior housing that extends around the imaging unit wherein the imaging unit is movable within the exterior housing between multiple positions to locate the imaging unit in proximity to one of the fractions of the document to capture the corresponding fraction of the image of the document wherein an entirety of the image is captured by the combination of the fractions of the image.

41. The device of claim 40, further comprising an image forming unit positioned within the exterior housing to form a copy of the image captured by the imaging unit.

42. The device of claim 40, wherein the entirety of the image is divided into between about 2 and 5 fractions.

43. A method of scanning an image of a document with a scanning device, the method comprising the steps of:
   positioning the document on a target bed, the target bed being at a first distance from an imaging unit that is positioned within an interior of the scanning device;
   scanning the image of the document on the target bed with the imaging unit;
   after scanning, moving the target bed in closer proximity to the imaging unit and substantially minimizing a size of the scanning device.

44. The method of claim 43, wherein the step of moving the target bed in closer proximity to the imaging unit comprises moving a first housing section of the scanning device towards a second housing section of the scanning device.

45. The method of claim 43, further comprising forming the scanned image on a media sheet as the media sheet moves through the scanning device.

46. The method of claim 45, further comprising forming the image on the media sheet after minimizing the size of the scanning device.

47. The method of claim 43, wherein the step of scanning the image of the document on the target bed with the imaging unit comprises scanning a first section of the image of the document when the imaging unit is in a first location and scanning a second section of the image of the document when the imaging unit is in a second different location.

48. A method of scanning a document with a scanning device, the method comprising the steps of:
   placing the document on a target bed;
   positioning an imaging unit at a first location within a housing relative to the target bed and scanning a first section of an image of the document; and
   positioning the imaging unit at a second location within the housing relative to the target bed and scanning a second section of the image of the document; the steps of scanning the first and second sections of the image are each performed in a single step and combine to capture an entirety of the image.

49. The method of claim 48, wherein the step of positioning the imaging unit at the second location within the housing comprises moving the imaging unit away from the first section of the document.

50. The method of claim 48, further comprising forming the scanned image on a media sheet that is moving through the housing.

* * * * *